US009264919B2

(12) United States Patent
Gunnarsson et al.

(10) Patent No.: US 9,264,919 B2
(45) Date of Patent: Feb. 16, 2016

(54) METHOD, NODE AND SYSTEM FOR MANAGEMENT OF A MOBILE NETWORK (75) Inventors: Fredrik Gunnarsson, Linkoping (SE); Mehdi Amirijoo, Linkoping (SE); Johan Moe, Mantorp (SE)

(73) Assignee: Optis Cellular Technology, LLC, Plano, TX (US)

( * ) Notice: Subject to any disclaimer, the term of this patent is extended or adjusted under 35 U.S.C. 154(b) by 135 days.

(21) Appl. No.: 14/122,645

(22) PCT Filed: Jun. 1, 2011

(86) PCT No.: PCT/SE2011/050692
§ 371 (c)(1),
(2), (4) Date: Nov. 26, 2013

(87) PCT Pub. No.: WO2012/166032
PCT Pub. Date: Dec. 6, 2012

(65) Prior Publication Data
US 2014/0112178 A1    Apr. 24, 2014

(51) Int. Cl.
*H04W 24/02* (2009.01)
*H04W 24/10* (2009.01)
(Continued)

(52) U.S. Cl.
CPC ............... *H04W 24/02* (2013.01); *H04B 17/15* (2013.01); *H04B 17/3911* (2013.01); *H04W 16/18* (2013.01); *H04W 24/08* (2013.01); *H04W 24/10* (2013.01)

(58) Field of Classification Search
CPC ..... H04W 16/18; H04W 24/08; H04W 24/10; H04W 24/02; H04B 17/3911; H04B 17/15
See application file for complete search history.

(56) References Cited

U.S. PATENT DOCUMENTS 7,035,632 B2    4/2006  Gutowski
7,525,484 B2 *  4/2009  Dupray et al. ............... 342/450
(Continued)

FOREIGN PATENT DOCUMENTS

EP          1191804           12/2008
WO      WO-02/073997           9/2002
WO     WO-2008/030146          3/2008

OTHER PUBLICATIONS

PCT International Search Report, International Application No. PCT/SE2011/050692, mailed Feb. 22, 2012, 5 pages.
(Continued)

*Primary Examiner* — Brian D Nguyen (57) ABSTRACT

The invention relates to a method for estimating performance in a mobile network, a method for generating a performance map, use of such methods, a network management system, and a network node in the mobile network for performing the methods. The exemplary method including receiving localized user equipment measurements from a user equipment in the mobile network, including the user equipment measurements in sets and determining at least one antenna characteristics model for the set of user equipment measurements. A path loss model is determined for the user equipment measurements. A localized performance measurement is determined by deducting an estimated antenna impact from the estimated path loss for the user equipment measurement. The operations are repeated to generate a spatial performance map for the mobile network, wherein updates of the spatial performance map are based on further user equipment measurements from the user equipment in the mobile network.

20 Claims, 3 Drawing Sheets (51) Int. Cl.
    *H04W 24/08*   (2009.01)
    *H04W 16/18*   (2009.01)
    *H04B 17/15*   (2015.01)
    *H04B 17/391*  (2015.01)

(56) References Cited

U.S. PATENT DOCUMENTS

| | | | |
|---|---|---|---|
| 2002/0063656 | A1 | 5/2002 | Gutowski |
| 2005/0019732 | A1 | 1/2005 | Kaufmann et al. |
| 2006/0080319 | A1* | 4/2006 | Hickman et al. ............... 707/10 |
| 2009/0257353 | A1* | 10/2009 | Song et al. .................... 370/241 |
| 2009/0279519 | A1* | 11/2009 | Brisebois et al. ............. 370/338 |
| 2011/0059735 | A1 | 3/2011 | Thiel et al. |
| 2011/0110338 | A1* | 5/2011 | Khoryaev et al. ............. 370/335 |
| 2011/0250880 | A1* | 10/2011 | Olsson ......................... 455/423 |
| 2012/0106370 | A1* | 5/2012 | Radulescu et al. ............ 370/252 |
| 2012/0157108 | A1* | 6/2012 | Boudreau et al. ............. 455/450 |

OTHER PUBLICATIONS

PCT Written Opinion of the International Searching Authority, International Application No. PCT/SE2011/050692, mailed Feb. 22, 2012, 4 pages.

Brunner, et al., "Generation of Pathloss and Interference Maps as SON Enabler in Deployed UMTS Networks," *IEEE 69th Vehicular Technology Conference, VTC Spring 2009*, (Apr. 26-29, 2009), 5 pages.

International Report on Patentability, Application No. PCT/SE2011/050692, issued on Dec. 2, 2013, 6 pages.

European Search Report, Application No. EP 11867060.3, mailed Jul. 31, 2014, 3 pages.

European Search Report, Application No. EP 11867060.3, mailed Aug. 25, 2014, 6 pages.

"Evolved Universal Terrestrial Radio Access (E-UTRA) and Evolved Universal Terrestrial Radio Access Network (E-UTRAN); Overall description; Stage 2", *3GPP TS 36.300 V8.2.0 (Release 8); 3rd Generation Partnership Project; Technical Specification Group Radio Access Network*, (Sep. 2007), 109 pages.

"Evolved Universal Terrestrial Radio Access (E-UTRA); Physical layer; Measurements", *3GPP TS 36.214 V8.7.0 (Release 8); 3rd Generation Partnership Project; Technical Specification Group Radio Access Network*, (Sep. 2009), 12 pages.

"Evolved Universal Terrestrial Radio Access (E-UTRA); Radio Resource Control (RRC); Protocol specification", *3GPP TS 36.331 V9.2.0 (Release 9); 3rd Generation Partnership Project*, (Mar. 2010), 248 pages.

"Evolved Universal Terrestrial Radio Access (E-UTRA); Study on Minimization of drive-tests in Next Generation Networks", *3GPP TR 36.805 V9.0.0 (Release 9); 3rd Generation Partnership Project; Technical Specification Group Radio Access Network*, (Dec. 2009), 24 pages.

"Evolved Universal Terrestrial Radio Access Network (E-UTRAN); Stage 2 functional specification of User Equipment (UE) positioning in E-UTRAN", *3GPP TS 36.305 V9.2.0 (Release 9); 3rd Generation Partnership Project; Technical Specification Group Radio Access Network*, (Mar. 2010), 52 pages.

"Informative List of SON Use Cases", *NGMN Project 12; Detailed Description of uses cases for Self Organizing functionality in 2G/3G/LTE RAN and Core Net; Annex A (informative) of "Use Cases related to Self Organising Network. Overall Description"*, (Apr. 17, 2007), 36 pages.

Gunnarsson, et al., "Downtilted Base Station Antennas—A Simulation Model Proposal and Impact on HSPA and LTE Performance", *Vehicular Technology Conference, 2008. VTC 2008—Fall. IEEE 68th*, (Sep. 21-24, 2008), 5 pages.

Medbo, et al., "Propagation Channel Impact on LTE Positioning Accuracy", *Personal, Indoor and Mobile Radio Communications, 2009 IEEE 20th International Symposium on.* (Sep. 13-16, 2009), 5 pages.

* cited by examiner

METHOD, NODE AND SYSTEM FOR MANAGEMENT OF A MOBILE NETWORK

CROSS-REFERENCE TO RELATED APPLICATIONS

This application is a National stage of International Application No. PCT/SE2011/050692, filed Jun. 1, 2011, which is hereby incorporated by reference.

FIELD OF THE INVENTION

The present invention relates to modeling of a radio environment for management of a mobile network.

BACKGROUND OF THE INVENTION

The architecture of present day mobile network includes a radio access network, a core network and user equipment connecting to the radio access network. The radio access network includes radio base stations or nodes for setting up the connection to the user equipment.

Whilst the nodes of the radio access network mainly can be considered as stationary with fixed location, the user equipment is mobile and may take basically any position within the network. Planning, configuring, optimizing, and maintaining a radio access network, the mobile operator must ensure a radio propagation behavior in the system that corresponds to the location of user equipment in the network. Today, operators resort to planning tools to dimension and plan their networks according to a specific business strategy. The approach based on planning tools and prediction is, however, not fully accurate. Reasons for the inaccuracies are imperfections in the used geographic data, simplifications and approximations in the applied propagation models, and changes in the environment, e.g., construction/demolition or seasonal effects (foliage changes). Furthermore, changes in the traffic distribution and user profiles can lead to inaccurate prediction results. The above mentioned shortcomings force operators to continuously optimize their networks using measurements and statistics, and to perform drive/walk tests. Drive/walk testing provides a picture of the end user perception in the field and enables the operator to identify locations causing poor performance and their corresponding cause (e.g., incorrect tilt or handover settings). Drive/walk tests are, however, not ideal since only a limited part of the network can be analyzed due to access restrictions and the cost and time involved. Further, only a snapshot in time of the conditions in the field is captured. Wireless network operators today have considerable manual effort in network management, e.g., configuring the radio access network. These manual efforts are costly and consume a great part of operational expenditures (OPEX).

e-UTRAN (evolved UMTS Terrestrial Radio Access Network) is a future wireless access network standard optimized for packet data and providing higher data rates. An important E-UTRAN requirement from the operators' side is a significant reduction of the manual effort in network management for this future wireless access system. This involves automation of the tasks typically involved in operating a network, e.g., planning, verification through, e.g., drive/walk testing, and optimization.

A method for improving network management in e-UTRAN is to use the user equipment (UE) reports. The UE can report anything that can be configured via the radio resource control measurement control and reporting procedures. A standardization of such UE reports is carried out within 3GPP.

The user equipment collects data to determine observed service quality, e.g., RF signal strength, along with the location where the measurement was taken.

The user equipment reports are post-processed by a function which continuously monitors the network and estimates the spatial network performance, e.g., coverage and throughput. The UE reporting solution addresses the problems with prior approaches by probing a larger sample of UE locations, reducing the costs involved in drive/walk tests, and continuously tracking the network state as the network and its environment (e.g., topography) evolve.

Post processing of the user equipment reports for network management includes post processing of measured path loss data. Path loss is a term for the attenuation between a source antenna and the RF signal strength at a location within the network. The attenuation is due to antenna characteristics and propagation aspects. Performance in the radio network and path loss resulting from propagation aspects may be separately determined by removing the effect of the antenna characteristics. Such determination is achieved in post processing of the measurement reports.

WO2008/030146 discloses a post-processing technique for calculating path loss to one or more points in a coverage area and mapping the coverage area. The propagation model is based on determination of dominant radiation path to measurement points in the antenna's coverage area. The disclosed technique provides for a joint propagation and antenna model.

C. Brunner and D. Flore, "Generation of Pathloss and Interference Maps as SON Enabler in Deployed UMTS Networks", IEEE, 69$^{th}$ Vehicular Technology Conference (VTC 2009-Spring), pp. 1-5, 2009. Proposes to generated path loss and interference maps based on signal strength and quality measurements sent in measurement report messages from user equipment to a radio network controller (RNC). The method creates performance maps based on measurement data. A disadvantage with this method is that information about network performance can be provided only for those parts in the network where measurement data is available.

U.S. Pat. No. 7,035,632 disclose another post-processing technique for creating a propagation model for a radio network in order to enable improved radio network management. The propagation model is established based on a priori knowledge of antenna characteristics and an antenna pattern derivable from the antenna characteristics.

However, the true antenna behavior may in many instances differ significantly from what may be established based on a priori knowledge of the antenna characteristics. With deviations between true antenna behavior and an antenna pattern derived from a priori knowledge of antenna characteristics, the resulting propagation model will be misleading and, thus, unsuitable for network management purposes.

SUMMARY OF THE INVENTION

It is an object of the present invention to provide a method to improve the ability to predict true radio environment. This object is achieved by means of the method for estimating performance in a mobile network wherein a joint antenna and propagation model is established based on user equipment measurements in the radio network. An antenna characteristics model is determined that is applicable for the same user equipment measurements. A propagation model is established by removing the impact of the antenna based on the antenna characteristics model.

It is another object of the present invention to provide a method of generating performance maps for a mobile network wherein a path loss model and an antenna characteristics model is determined from user equipment measurements of a RF signal. The antenna impact on the user equipment measurement is estimated, whereupon a localized performance measurement is established by deducting the estimated antenna impact from a predicted path loss. Uncertain or missing values are interpolated.

It is a further object of the invention to provide for use of the inventive methods in a radio network management for a mobile network.

It is yet another object of the invention to provide a network management system in a mobile network comprising user equipment receiving and transmitting information to and from network nodes. The network management system includes user equipment reporting localized user equipment measurements, network nodes for transmitting and receiving information to and from user equipment in the mobile network, domain management nodes and at least one network management node. The network management system includes at least one node in the network management system for collecting and processing the user equipment measurements, the user equipment location and measurement unit including means for processing a user equipment measurement.

It is also an object of the invention to provide a network node in a mobile network comprising a user equipment location and measurement unit. The inventive location and measurement unit include means for receiving and processing user equipment measurements and means for generating an antenna model, a propagation model and an isotropic signal strength map.

The inventive methods, use, network management system and network node allow for automation of radio environment modeling and better predictions of a true radio environment thus improving radio network management.

DETAILED DESCRIPTION OF THE INVENTION

In the following, the invention will be described for e-UTRAN, the air interface of the 3GPP's ($3^{rd}$ Generation Partnership Project) LTE (Long Term Evolution) upgrade path for mobile networks. However, it should be noted that the invention can be applied to other types of networks and standards, e.g., GSM and UTRAN. E-UTRAN is used merely as an exemplifying standard to illustrate the main concept.

Figure 1:
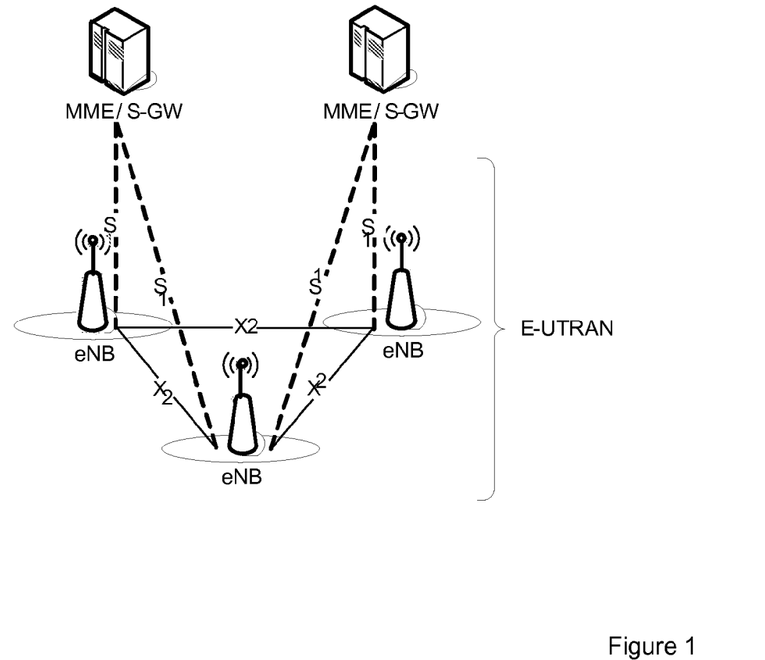
FIG. 1 Radio system architecture
FIG. 2 Network management system
FIG. 3 Measurement and localization architecture
FIG. 4 Flow chart of an inventive method

FIG. 1 discloses the architecture of such a Long Term Evolution LTE radio system. In LTE the downlink is based on orthogonal frequency division multiplexing (OFDM).

The E-UTRAN is made up of eNB nodes, which may be connected to each other. Each eNB contains at least one radio transmitter, receiver, control section and power supply. In addition to radio transmitters, and receivers, eNBs contain resource management and logic control functions that allow eNBs to directly communicate with each other via an X2 interface. eNB functions include radio resource management—RRM, radio bearer control, radio admission control—access control, connection mobility management, resource scheduling between UEs and eNB radios, header compression, link encryption of the user data stream, packet routing of user data towards its destination (usually to the EPC or other eNBs), scheduling and transmitting paging messages (incoming calls and connection requests), broadcast information coordination (system information), and measurement reporting (to assist in handover decisions).

Each eNB is composed of an antenna system (typically a radio tower), building, and base station radio equipment. Base station radio equipment consists of RF equipment (transceivers and antenna interface equipment), controllers, and power supplies.

User equipments in the radio network connect to the radio access network through the eNB nodes. User equipment—UE—can be many types of devices ranging from simple mobile telephones to digital televisions. In the initial cell selection process, no knowledge about RF channels carrying an E-UTRA signal is available in the user equipment. In this case the UE scans the E-UTRA frequency bands to find a suitable cell. Only the cell with the strongest signal per carrier will be selected by the UE.

Path loss is the reduction in power density of a radio wave as it propagates through space. Path loss normally includes propagation losses caused by antenna directivity losses, the expansion of the radio wave front in free space resulting in a propagation loss dependent on the distance between the transmitter and the receiver, absorption losses when the signal passes through media not transparent to electromagnetic waves, diffraction losses when part of the radio-wave front is obstructed by an opaque obstacle, and losses caused by other phenomena. The signal radiated by a transmitter may also travel along many and different paths to a receiver simultaneously; this effect is called multipath. Multipath waves combine at the receiver antenna, resulting in a received signal that vary widely, depending on the distribution of the intensity and relative propagation time of the waves and bandwidth of the transmitted signal.

Path loss is established through prediction. Exact prediction is possible only for simpler cases, such as free space isotropic propagation or the flat-earth model. In the radio environment provided for in an operational mobile network, the path loss is calculated using a variety of approximations. Path loss is usually expressed in dB.

Empirical radio wave propagation prediction models are based on measured and averaged losses along typical classes of radio links. One commonly used such methods is the Okumura-Hata model.

Deterministic prediction methods based on the physical laws of wave propagation are also used; Ray Tracing is one such method. These methods are expected to produce more accurate and reliable predictions of the path loss than the empirical methods; however, they are significantly more expensive in computational effort and depend on the detailed and accurate description of all objects in the propagation space, such as buildings, roofs, windows, doors, and walls.

For any model, the collection of data has to be sufficiently large to provide enough likeliness or enough scope to all kind of situations that can happen in that specific scenario. Like all empirical models, radio propagation models do not point out the exact behaviour of a link, but predict a likely behaviour under similar conditions.

Base station antenna modeling mainly cover the far field gain in various directions. Popular models are separated into a horizontal plane model and a vertical plane model. The combined gain to all directions can be interpolated from the horizontal and vertical components; on approach is to combine the contribution from each model in logarithmic scale.

Figure 2:
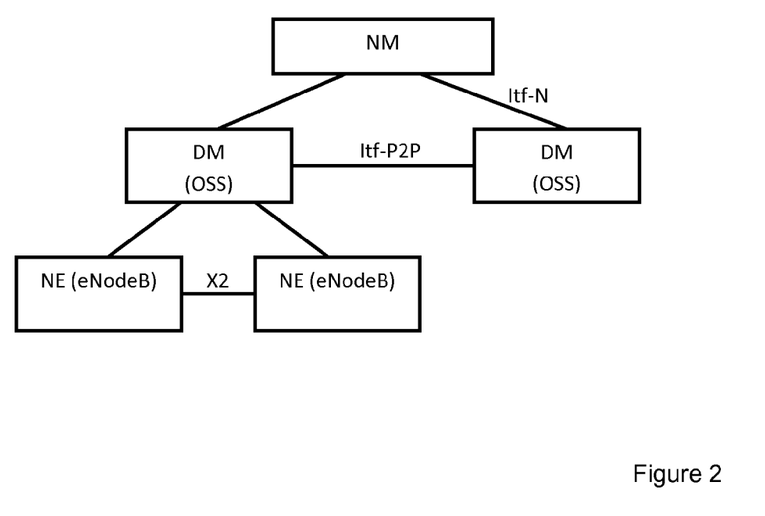

Whilst communicating in the network, the user equipments may be asked to report the observed service quality along with the locations where the measurements are taken. The reports are denoted as user equipment reports, UE reports. The UE reports are received in a network management system according to FIG. 2 and processed to establish the path loss that the user equipment is experiencing at the location where the measurement was taken. The node elements (NE), also referred to as eNodeB or eNB, are managed by a domain manager (DM), also referred to as the operation and support system (OSS). The user equipment measurements relate to transmissions from a node element (NE) antenna. The user equipment reports are gathered by a post-processing function, a user equipment location and measurement unit (LMU) in the network management system.

The location of the user equipment may be established by any type of localization method. For 3GPP LTE three different localization methods are foreseen. The first location function is the network-assisted version of Global Navigation Satellite Systems (GNSSs) like the Global Positioning System (GPS) or Galileo. Different GNSSs can be used individually or in combination with other GNSSs. The second localization method is the Observed Time Difference Of Arrival (OTDOA) method. This method utilizes the differences of time measurements of downlink radio signals from at least three eNBs along with the knowledge of the geographical coordinates of the measured eNBs and their relative downlink timing for calculating the UE position. The last localization method, the enhanced cell ID positioning method, uses information about the serving cell and the knowledge of the geographical coordinates of the serving eNB for estimating the UE position. Hybrid positioning using multiple methods from the above mentioned positioning methods is also supported. The invention is not limited to these localization methods that merely exemplify possible methods for establishing the position of the user equipment to include in the user equipment measurement report.

The user equipment measurement report may also include estimated errors (uncertainty) of the position and the velocity of the UE. The uncertainty of the position information depends on the used method, the position of the UE within the coverage area, and the activity of the UE.

In addition to position information, the UE reports include measurements indicative of path loss. According to the e-UTRAN standard, the user equipment may report two measurements indicative of path loss:

RSRP (Reference Symbol Received Power): It is determined for a considered cell as the linear average over the power contributions (in [W]) of the resource elements that carry cell-specific reference signals within the considered measurement frequency bandwidth.

RSRQ (Reference Symbol Received Quality): Reference Signal Received Quality (RSRQ) is defined as the ratio N×RSRP/(E-UTRA carrier RSSI), where N is the number of RB's of the E-UTRAN carrier RSSI measurement bandwidth. The measurements in the numerator and denominator shall be made over the same set of resource blocks.

The user equipment reports are collected together with the corresponding position and time of measurement in a user equipment location and measurement unit (LMU). In the disclosed embodiment it is primarily the RSRP measurement that forms a basis for further processing in the LMU.

Figure 3:
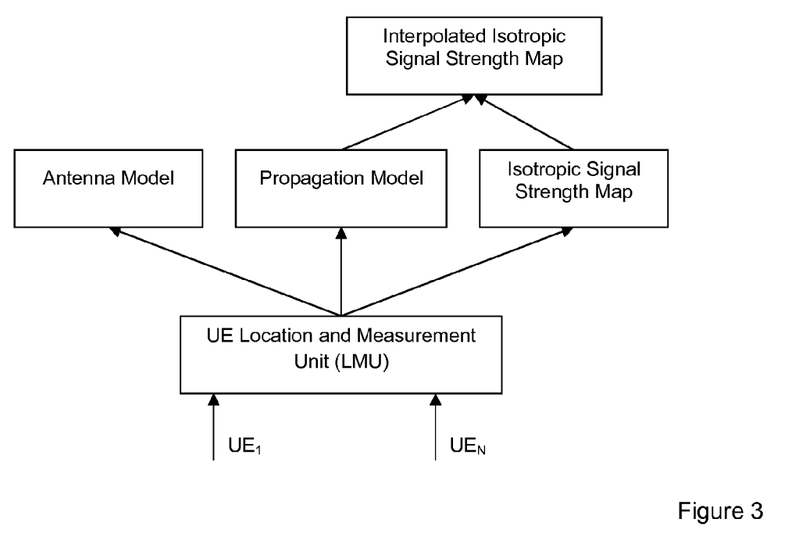

FIG. 3 illustrates an LMU wherein an antenna model, a propagation model and an isotropic signal strength map is generated. Localized user equipment UE measurements are collected and processed in the LMU. Modeling both the antenna gain and radio condition propagation, it is possible to jointly estimate an antenna model, a propagation model and the isotropic propagation. Predictions from these models may be interpolated to derive an interpolated isotropic signal strength map.

Figure 4:
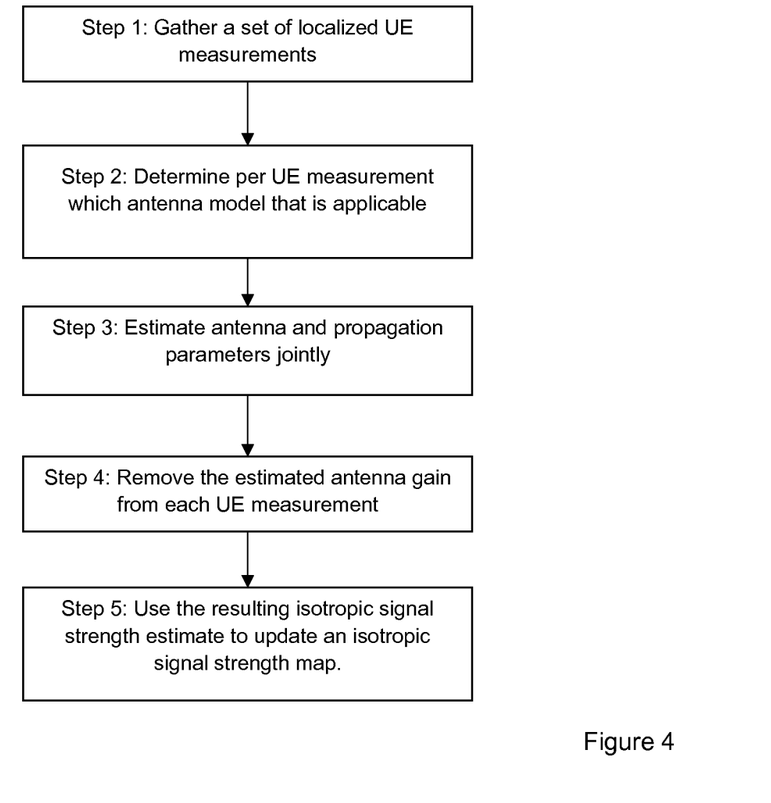

FIG. 4 illustrates a number of steps preferably carried out within a user equipment location and measurement unit (LMU) to estimate performance in a mobile network. The steps are also applicable for generating a performance map for a mobile network. Configuration information relating to site and antenna locations, antenna beam azimuth directions, antenna max gain, antenna heights and assumed user equipment height is available to the LMU. Information relating to spatial land-use classification information may also be available to the processing unit.

In a first step (step 1), the LMU collects the measurement data together with the corresponding position and time when the measurement was taken. The measurement data is included in a localized user equipment measurement. The UE measurement may also include indications of land-use classification. Measurements are collected over a time period when the antenna configuration in the serving eNB has been fixed. A requirement for accuracy in the prediction is also that no significant environmental changes, e.g., new buildings or other types of obstacles, have been introduces during the time period of observation.

In step 2, measurements from user equipment are grouped together in the LMU in a set of user equipment measurements. The localized UE measurements are grouped in sets so that measurements from user equipment served by the same antenna are grouped together. In the case that the user equipment measurements include information indicative of land-use category, the measurements may be further divided into subsets based on land-use categorization. A suitable antenna model is determined for each set of UE measurement.

The processing in the LMU involves modeling of a propagation model and an antenna model based on the measurements in the UE reports in a third step. In the exemplifying embodiment disclosed herein below, the measurements have been grouped so that all measurements originate from the same land-use category and from a specific cell served by a known eNB. Also the antenna azimuth beam direction is assumed to be known.

In the exemplifying antenna modeling, the following assumptions are made $$|\varphi| \le BW_h \sqrt{\frac{FBR_h}{12}} \qquad \text{Req. 1a}$$

where

Azimuth is represented by $\varphi$, $-180 \le \varphi \le 180$

The horizontal bandwidth is denoted $BW_h$, which represents the bandwidth at which the antenna gain is half of the max gain The interpretation of $FBR_r$ is more intuitive by determining the antenna gain in the beam direction ($\varphi=0$) and in the opposite direction ($\varphi=180$). This gives $G_h(0)=G_m$ and $G_h(180)=G_m-FBR_h$. Hence, the front-to-back ratio denoted $FBR_r$ means the relative difference between antenna beam direction gain, and the backlobe gain.

A typical antenna may have $G_m=18$ dB, $BW_h=65$ degrees, and $FBR_h=30$ dB.

$$|\psi - \psi_{etilt}| \leq BW_v \sqrt{\frac{-SLL_v}{12}} \qquad \text{Req. 1b}$$

where
- Elevation is represented by Ψ (the use of θ is more common, but avoided here since θ will be used to represent the parameter vector), where $-90 \leq \Psi \leq 90$ and $\Psi=0$ describes the horizontal plane.
- Electrical antenna downtilt $\Psi_{etilt}$ models the angle downwards from the horizontal plane at which the antenna is electrically directed.
- The vertical bandwidth is denoted $BW_v$, which represents the bandwidth at which the antenna gain is half of the max gain
- The vertical pattern sidelobe level is denoted $SLL_{rv}$ which means the sidelobe gain level in relation to the antenna beam direction gain A typical antenna may have $BW_v$=7-15 degrees, and $SLL_v$=-18 dB.

All measurements are assumed to originate from the same land-use category and from a specific cell served by a base station at a known location. Also the antenna azimuth beam direction is assumed known.

There are a number of known models for antenna modeling. The antenna model discussed in the following is provided as means of exemplifying the invention, but the invention is not limited to the discussed antenna model or any other antenna model.

An antenna model can be expressed as:

$$G(\varphi, \psi) = G_m - 12\left(\frac{\varphi}{BW_h}\right)^2 - 12\left(\frac{\psi - \psi_{etilt}}{BW_v}\right)^2$$

This can be rewritten as $$G(\varphi, \psi) = 1 \cdot \left[G_m - 12\left(\frac{\psi_{etilt}}{BW_v}\right)^2\right] + (-12\varphi^2) \cdot \frac{1}{BW_h^2} + \qquad \text{Mdl. 1}$$

$$(-12\psi^2) \cdot \frac{1}{BW_v^2} + 24\psi \cdot \frac{\psi_{etilt}}{BW_v^2}$$

$$= [1 (-12\varphi^2)(-12\psi^2) 24\psi] \cdot$$

$$\left[G_m - 12\left(\frac{\psi_{etilt}}{BW_v}\right)^2 \quad \frac{1}{BW_h^2} \quad \frac{1}{BW_v^2} \quad \frac{\psi_{etilt}}{BW_v^2}\right]^T$$

UE measurement positions that satisfies requirements 1a and b above corresponds to a linear regression. Using the following parameter values $G_m$=18 dB, $BW_h$=65 degrees, and $FBR_h$=30 dB including an antenna downtilt of $\Psi_{etilt}$=9 degrees for a site to site distance of 500 m, the requirements correspond to $$|\varphi| \leq 65° \sqrt{\frac{30}{12}} \approx 103°$$

and $$|\psi - 9°| \leq 6.2° \sqrt{\frac{18}{12}} \approx 7.6° \Leftrightarrow 1.4° \leq \psi \leq 16.6°$$

For a typical three-sector base station, each antenna covers one third of the base station coverage area, which in degrees is ±60 degrees, i.e. a range of 120 degrees. The azimuth requirement above (±103 degrees) thus corresponds to a wider range than a typical cell so that is most likely not excluding any mobiles. With a relative antenna height of 30 m, the second requirement means that the elevation requirements are valid for distances from the base station between 30/tan(16.6°)=100 meter and 30/tan(1.4°)–1200 meter.

For localized UE measurements closer to the base station than 100 meters, Model 2 instead gives $$G(\varphi, \psi) = 1 \cdot [G_m - SLL_v] + (12\varphi^2) \cdot \qquad \text{Mdl. 2}$$

$$\frac{1}{BW_h^2} + 0 \cdot \frac{1}{BW_v^2} + 0 \cdot \frac{\psi_{etilt}}{BW_v^2}$$

$$= [1 (-12\varphi^2) 0 \; 0] \cdot$$

$$\left[G_m - SLL_v \quad \frac{1}{BW_h^2} \quad \frac{1}{BW_v^2} \quad \frac{\psi_{etilt}}{BW_v^2}\right]^T$$

Indicator $R_2$ is equal to 1 if requirement 1b is fulfilled, and 0 if not. Thus, Model 1 and 2 can be combined into one linear regression antenna model:

$$G(\varphi, \psi) = [R_2 \quad 1-R_2 \quad (-12\varphi^2) \quad R_2(-12\psi^2) \quad 24\psi R_2] \cdot \qquad \text{Mdl. 3}$$

$$\left[G_m - 12\left(\frac{\psi_{etilt}}{BW_v}\right)^2 \quad G_m - SLL_v \quad \frac{1}{BW_h^2} \quad \frac{1}{BW_v^2} \quad \frac{\psi_{etilt}}{BW_v^2}\right]^T$$

The path loss is for a set of user equipment measurements determined in step 4. The path loss can generally be modeled by $$y(x_k) = f(\theta, x_k) + \omega = f([\theta_{Ant}^T, \theta_{Prop}^T]^T, x_k) + \omega$$

where θ represents the modeling parameters that may be partitioned in antenna parameters $\theta_{Ant}$ and propagation parameters $\theta_{Prop}$. It is reasonable to assume that the model can be separated into two additive parts:

$$y(x_k) = f_{Ant}(\theta_{Ant}, x_k) + f_{Prop}(\theta_{Prop}, x_k) + \omega$$

Further, let $x_o$ denote the base station location, $\Delta h_o$ the relative height difference between the position from which the UE equipment measurement was established and the base station antenna. This gives the relative distance $r_k$ between UE k and the base station location $$r_k = |x_k - x_o|$$

The azimuth relative the antenna beam direction $\phi_o$ $$\phi_k = \text{angle}(x_k - x_o) - \phi_o$$

And the elevation angle $$\psi_k = \text{angle}(r_k, \Delta h_o)$$

Using these quantities that can be readily derived from the estimated position of the user equipment, site position, antenna beam direction and relative antenna height difference, the separated model can be expressed as $$y(r_k, \phi_k, \psi_k) = f_{Ant}(\theta_{Ant}, \phi_k, \psi_k) + f_{Prop}(\theta_{Prop}, r_k) + \omega \qquad \text{Mdl. 4}$$

The resulting joint antenna and propagation model is a linear regression.

$$y(r_k, \varphi_k, \psi_k) = \qquad \text{Mdl. 5}$$
$$[R_2 \quad 1-R_2 \quad (-12\varphi_k^2)R_2(-12\psi_k^2) \quad 24\psi_k R_2 - r_k] \cdot$$
$$\left[G_m - 12\left(\frac{\psi_{etilt}}{BW_v}\right)^2 + g_0 + \alpha r_o \ G_m - SLL_v + g_0 + \right.$$
$$\left. \alpha r_o \ \frac{1}{BW_h^2} \ \frac{1}{BW_v^2} \ \frac{\psi_{etilt}}{BW_v^2}\alpha\right]^T + \omega$$

The model is not fully observable in the sense that all constants can be resolved. However, some constants, such as the antenna max gain $G_m$, are possible to derive from knowledge of the antenna characteristics. Moreover, the propagation model does not need to separated $(g_o + \alpha r_o)$ into individual parameters. This makes the model observable. The linear regression model can be expressed as $$y(r_k, \phi_k, \psi_k) = \chi(r_k, \phi_k, \psi_k)^T \theta$$

Different land-use implies different penetration loss. Modeling-wise, this means different $g_o$. If the gathered data represents user equipment from different land-use classes, then one option is to divide the data in different sets and estimate joint models for each set as stated above. However, it is also possible to extend the model to include more than one land-use class. Then the first two elements of $\chi(r_k, \phi_k, \Psi_k)$ and $\theta$ needs to be repeated for each additional land-use class, thus requiring estimation of two additional parameters in $\theta$ per land-use class. For example with two landuse classes A and B, indicators $R^A$ (equal to 1 if the landuse class is A, and 0 otherwise) and $R^B$ (equal to 1 if the landuse class is B, and 0 otherwise) and landuse specific path loss constants $g^A_0$ and $g^B_0$ respectively.

$$y(r_k, \varphi_k, \psi_k) = \qquad \text{Mdl. 6}$$
$$[R^A R_2 R^A (1-R_2) R^B R_2 R^B (1-R_2)(-12\varphi_k^2)R_2(-12\psi_k^2)24\psi_k R_2 -$$
$$r_k r] \cdot \left[G_m - 12\left(\frac{\psi_{etilt}}{BW_v}\right)^2 + g_0^A + \right.$$
$$\alpha r_o G_m - SLL_v + g_0^A + \alpha r_o \ldots G_m -$$
$$12\left(\frac{\psi_{etilt}}{BW_v}\right)^2 + g_0^B + \alpha r_o G_m -$$
$$\left. SLL_v + g_0^B + \alpha r_o \ldots \frac{1}{BW_h^2} \ \frac{1}{BW_v^2} \ \frac{\psi_{etilt}}{BW_v^2}\alpha\right]^T + \omega$$

Hence, either we divide the UE measurements into set depending on both antenna configuration, model applicability according to the requirements 1a and 1b, and landuse class, or two or several of these aspects are grouped together to form greater sets, and use indicators in the regressor in order to indicate model or landuse class etc.

There are N measurements of the received signal strength in logarithmic scale $y(x_k)$, at estimated positions $x_k$ k=1 . . . N. Given observed measurements and a joint antenna and propagation model, the antenna and propagation parameters are estimated jointly. The relation between the parameters and the observations may be linear or non-linear.

The parameters of the linear regression $$y(r_k, \phi_k, \psi_k) = \chi(r_k, \phi_k, \psi_k)^T \theta + \omega$$

can be estimated using Least-Squares. The loss function may in an embodiment of the invention be defined as $$V_N(\theta) = \frac{1}{N}\sum_{k=1}^{N}(y(r_k, \varphi_k, \psi_k) - \chi(r_k, \varphi_k, \psi_k)^T \theta)^2$$

The parameter estimate is given by the vector that minimizes the loss function, which mathematically can be expressed as $$\hat{\theta}_N = \underset{\theta}{\operatorname{argmin}} V_N(\theta)$$

The solution can be analytically derived and given by the normal equations $$\hat{\theta}_N = \left[\sum_{k=1}^{N}\chi(r_k, \varphi_k, \psi_k)\chi(r_k, \varphi_k, \psi_k)^T\right]^{-1}\sum_{k=1}^{n}\chi(r_k, \varphi_k, \psi_k)y(r_k, \varphi_k, \psi_k)$$

The actual antenna and propagation parameters are resolved from the components of the estimated parameter vector $\hat{\theta}_N$ and provide a resulting joint antenna and propagation model, a path loss model relevant to the user equipment measurements.

Some estimation accuracy information can also be extracted. First, the noise variance $\hat{\lambda}_N = \text{Var}\{\omega\}$ $$\hat{\lambda}_N = V_N(\hat{\theta}_N) = \frac{1}{N}\sum_{k=1}^{N}(y(r_k, \varphi_k, \psi_k) - \chi(r_k, \varphi_k, \psi_k)^T\hat{\theta}_N)^2$$

And then the parameter estimate covariance matrix $$\text{Cov}\{\hat{\theta}_N\} = \frac{1}{N}\hat{\lambda}_N\left[\sum_{k=1}^{N}\chi(r_k, \varphi_k, \psi_k)\chi(r_k, \varphi_k, \psi_k)^T\right]^{-1}$$

With the disclosed path loss model, the antenna and isotropic propagation parameters are jointly predicted.

With the estimated model the antenna gain is reproduced from the estimated model. In a subsequent step 4, the antenna gain impact is removed from each localized user equipment signal strength measurement.

The steps are repeated for new, localized user equipment measurements in order to generate spatial performance measurements that are presented in the form of a performance map for the mobile network. The performance measurements represent isotropic strength measurements.

In a concluding step 5, the estimated localized isotropic signal strength measurements are used to update an isotropic signal strength map.

The user equipment measurements may include information indicative of the actual antenna in the eNB, thus provisioning for the inclusion of a priori antenna knowledge into the modeling.

A use case for estimated isotropic signal strength maps is to support coverage and capacity optimization, for example to better tune the antenna orientation to fit the coverage and capacity needs. The removal of the antenna influence to the propagation data means that the resulting map is ideally independent of antenna tuning, and the data is valuable also after tuning.

Moreover, the estimated antenna model can be used to evaluate different tuning alternatives by combining the isotropic propagation data with differently configured antenna orientations.

The invention claimed is:

1. A method for estimating performance in a mobile network, the method comprising the operations of:
receiving localized, user equipment measurement from a user equipment (UE) in the mobile network;
incorporating the user equipment measurement in a set of user equipment measurements; determining at least one antenna characteristics model for the set of user equipment measurements;
determining a path loss model for the set of user equipment measurements;
determining an applicable antenna characteristics model for the user equipment measurement and estimate antenna impact on the user equipment measurement;
estimating path loss related to the user equipment measurement;
deducting estimated antenna impact from the estimated path loss to determine a localized, instantaneous performance measurement; and
repeating the operations to generate a spatial performance map for the mobile network, wherein updates to the spatial performance map are based on further user equipment measurements from the user equipment in the mobile network.

2. The method according to claim 1, wherein the applicable antenna characteristics model is determined based on classifications of the UE measurements.

3. The method according to claim 2, wherein the localized, user equipment measurement includes signal strength measurements and an estimated position.

4. The method according to claim 3, wherein the localized user equipment measurement includes a time of measurement, and wherein the operations are repeated over a period of time so that the spatial performance map includes time-averaged performance measurements.

5. The method according to claim 4, wherein the path loss model is a joint antenna characteristics and propagation model, and wherein modeling parameters of the path loss model include antenna parameters and propagation parameters.

6. The method according to claim 5, wherein antenna parameters include an antenna beam direction, a relative antenna height difference, and an antenna site position.

7. The method according to claim 6, wherein the modeling parameters include a land-use classification.

8. The method according to claim 7, wherein the method is performed at a stationary network node in the mobile network.

9. The method according to claim 8, wherein a priori antenna pattern knowledge is considered when determining the antenna characteristics model.

10. The method according to claim 9, wherein the spatial performance map is a model of a true radio environment.

11. A method for generating a performance map for a mobile network, the method comprising the operations of:
determining at least one antenna characteristics model applicable in the mobile network;
determining a path loss model applicable in the mobile network;
determining an applicable antenna characteristics model for a localized user equipment measurement and estimate antenna impact on the user equipment measurement;
estimating path loss related to the user equipment measurement;
deducting estimated antenna impact from the estimated path loss to determine a localized, performance measurement; and
repeating the steps-operations to generate a performance map for the mobile network.

12. The method according to claim 11, wherein the method is performed for network management of the mobile network.

13. The method according to claim 11, wherein the performance map is combined with antenna configuration parameters in order to estimate path loss prior to effecting an antenna reconfiguration.

14. An apparatus for estimating performance in a mobile network, the apparatus comprising:
at least one controller operable to:
receive localized, user equipment measurement from a user equipment (UE) in the mobile network;
incorporate the user equipment measurement in a set of user equipment measurements;
determine at least one antenna characteristics model for the set of user equipment measurements;
determine a path loss model for the set of user equipment measurements;
determine an applicable antenna characteristics model for the user equipment measurement and estimate antenna impact on the user equipment measurement;
estimate path loss related to the user equipment measurement;
deduct estimated antenna impact from the estimated path loss to determine a localized, instantaneous performance measurement; and
repeat the operations to generate a spatial performance map for the mobile network, wherein updates to the spatial performance map are based on further user equipment measurements from the user equipment in the mobile network.

15. The apparatus of claim 14, wherein the applicable antenna characteristics model is determined based on classifications of the UE measurements.

16. The apparatus of claim 15, wherein the localized, user equipment measurement includes signal strength measurements and an estimated position.

17. The apparatus of claim 16, wherein the localized user equipment measurement includes a time of measurement, and wherein the operations are repeated over a period of time so that the spatial performance map includes time-averaged performance measurements.

18. An apparatus for generating a performance map for a mobile network, the apparatus comprising:
at least one controller operable to:
determine at least one antenna characteristics model applicable in the mobile network;
determine a path loss model applicable in the mobile network;
determine an applicable antenna characteristics model for a localized user equipment measurement and estimate antenna impact on the user equipment measurement;
estimate path loss related to the user equipment measurement;
deduct estimated antenna impact from the estimated path loss to determine a localized, performance measurement; and
repeat the steps-operations to generate a performance map for the mobile network.

19. The apparatus of claim 18, wherein the operations are performed for network management of the mobile network.

20. The apparatus of claim 18, wherein the performance map is combined with antenna configuration parameters in order to estimate path loss prior to effecting an antenna reconfiguration.

* * * * *